United States Patent Office 3,255,110
Patented June 7, 1966

3,255,110
LUBRICATING COMPOSITION
Robert L. Peeler, Albany, Calif., assignor to Chevron Research Company, a corporation of Delaware
No Drawing. Filed Mar. 28, 1963, Ser. No. 268,558
3 Claims. (Cl. 252—47)

This application is a continuation-in-part of Peeler patent application Serial No. 213,097, filed July 30, 1963, and now abandoned.

This invention relates to lubricant compositions. More particularly, it relates to lubricants containing dibornylphenothiazine antioxidants having superior non-sludging properties.

Prior art antioxidants such as N-phenyl-α-naphthylamines have been extensively used in lubricating oils. However, the above compound suffers from a tendency to precipitate in the form of a polymer. The polymeric deposits are very detrimental, especially in oils and greases used in close tolerance machinery. Further, the tendency of the inhibitor to form hard sludges often causes clogging of oil ports in circulating oil systems. Additionally, the antioxidant sludge which forms a visible precipitate, gives a poor appearance to the oils.

It has now been found that dibornylphenothiazine is essentially nonsludging in lubricating oils and greases. This unexpected property of the new type of antioxidant is most remarkable since in nearly every other respect the new compound is superior to the old type of antioxidants.

Thus, the present invention involves a lubricating oil or a grease containing as a nonsludging antioxidant in an amount sufficient to inhibit oxidation dibornylphenothiazine. The preferred species are those having the dibornyl moiety para to the nitrogen, i.e., 3 and 7 positions of the phenothiazines. Other isomers are also included such as those where one of the bornyls is in 1, 2, 3 or 4 position and the other is in 6, 7, 8 or 9 position.

The compounds of the present invention are prepared by reacting dibornyldiphenylamine with sulfur and using iodine as catalyst. Alternatively, a dibornyldiphenylamine is reacted with sulfur dichloride using $AlCl_3$ as catalyst. Dibornyldiphenylamine is most conveniently prepared by the reaction of two mols of α-pinene with diphenylamine, using acidic catalysts such as anhydrous aluminum chloride.

The following examples illustrate the preparation of the aforementioned compounds and are not intended to unduly limit the scope of the invention.

*Example I.—Preparation of dibornyldiphenylamine*

169 g. of diphenylamine was added to a 1-liter, 3-neck flask equipped with a thermometer, stirrer and reflux condenser. The compound was heated to 60° C. and 13.3 g. of anhydrous $AlCl_3$ was added with stirring. 272 g. of α-pinene was added in small increments over a period of 1 hour, the temperature being allowed to rise to 68° C. The reaction mixture was then heated to 90° C. and held at that temperature with stirring for 1 hour. The mixture was cooled to room temperature and 200 ml. of petroleum thinner (100° C. distillation midpoint) was added. The product was washed first with 100 ml. 3 N sulfuric acid, then twice with 100 ml. portions of water, then with 100 ml. 5% $NaHCO_3$ solution, and finally with 100 ml. water, each time discarding the washings. The mixture was then stripped to a pot temperature of 160° C. The resulting product was a viscous liquid weighing 406 g. and analyzing 3.59% N by weight indicating that it consisted primarily of dibornyldiphenylamine and contained a minor amount of the monobornyl derivative.

Fractional distillation followed by analysis of the cuts gave the following results:

| Component: | Wt. percent |
|---|---|
| Solvent and unreacted α-pinene | 3.8 |
| Unreacted diphenylamine | 4.7 |
| Bornyldiphenylamine | 21.0 |
| Dibornyldiphenylamine | 70.5 |
| Total | 100.0 |

Infrared examination of the bornyl substituted compounds indicated that substitution occurred predominantly at the para position on each phenyl radical with only traces of the ortho and meta substituted compounds being present.

*Example II.—Preparation of bornyl phenothiazines by sulfurization of bornyldiphenylamine*

A 370 g. portion of a mixture of mono and dibornyldiphenylamines prepared by the procedure of Example I and having an average molecular weight of 370 was placed in a 3-neck flask equipped with a stirrer, thermometer, nitrogen inlet and vent. 64 g. of sulfur and 5 g. of iodine were then added, the mixture and flask were purged with nitrogen and heated to 170° C. and held for 3 hours with constant stirring. During this period, a considerable amount of $H_2S$ was evolved. The temperature was then raised to 200° C. and held for an additional 2 hours. The mixture was then cooled to room temperature, dissolved in 1000 ml. of benzene. The diluted mixture was filtered through paper, washed with water, then with a 20% aqueous NaOH solution and finally by three water washes. The solvent was then removed with nitrogen on a steam plate yielding 375 grams of a dark resinous material which analyzed 3.73% nitrogen with a molecular weight of 422. The theoretical values for the expected mixture of bornylphenothiazines are 3.50% by weight nitrogen and a molecular weight of 400.

*Example III.—Preparation of bornylphenothiazines by alkylation reaction*

199 g. of phenothiazine were dissolved in 600 ml. of chlorobenzene in a 2-liter 3-neck flask equipped with a thermometer, stirrer and reflux condenser. The mixture was heated to 110° C. and 13.3 g. of anhydrous $AlCl_3$ were added. 272 g. of α-pinene were added dropwise over a period of one hour. The mixture was maintained at a constant 110° C. with stirring for an additional 2 hour period. The mixture was then cooled to room temperature, washed with 100 ml. of 3 Normal aqueous HCl, twice with 200 ml. $H_2O$, once with 200 ml. 5% $NaHCO_3$ and finally twice with 200 ml. $H_2O$.

The chlorobenzene was removed by distilling to 200° C. pot temperature at 200 mm. Hg. The yield was 429 g. of a very viscous liquid which analyzed 2.82% N, 6.66% S and had a molecular weight of 608. Theoretical for dibornylphenothiazine is 2.97% N, 6.79% S and a molecular weight of 471.

Tests used to demonstrate the effectiveness of the compounds of this invention as antioxidants were performed using the product of Example II which, as stated in the example, was a mixture of mono and dibornylphenothiazines, being predominantly the dibornyl-substituted compound and also predominantly substituted at the 3 and 7 positions on the phenyl rings. Thus in the reported test data the above-described mixture is referred to as "dibornylphenothiazine."

As mentioned before, the compounds of the present invention are found to be superior to phenyl-α-naphthylamine, which although an effective and widely accepted oxidation inhibitor, precipitates a yellow sludge on mild oxidation in either oil or silicate base lubricants. This precipitate occurs even in white oil, which does not contribute to the sludge itself. Infrared, ultraviolet and elemental analyses of the precipitate shows it to be a polymer derived from the inhibitor rather than from the oil. Phenothiazine also forms sludges readily on oxidation; the products have been identified by Brown, Cole and Crowell, J. Org. Chem., vol. 20, p. 1772 (1955).

A combination of an induction period in 340° F. uncatalyzed oxidator test and time to appearance of a precipitate on sunlight exposure in typical mineral oil base composition was chosen to measure both antioxidant and nonsludging qualities of the lubricant. In the oxidation test a stirred sample of the oil is kept saturated with oxygen at a temperature of about 340° F. and the time in hours for 100 grams of oil to absorb 1000 ml. of oxygen is observed. In the sunlight exposure test the sample in conventional four ounce laboratory bottles is observed every 24 hour day, and the time in days noted for the first appearance of cloudiness or precipitate.

The test data given below embody the above-described procedure. N-phenyl-α-naphthylamine and phenothiazine were compared with the claimed compounds. All of the compounds were employed in concentrations of 10 millimoles per kilogram of medicinal grade white oil.

TABLE I

| Additive | Oxidation Life, Hours | Sunlight Life, Days |
| --- | --- | --- |
| N-phenyl-α-naphthylamine | 4.6 | 3 |
| Phenothiazine | 26 | 2 |
| Dibornylphenothiazine [1] | 21 | >30 |

[1] Predominantly the 3,7 isomer.

The data illustrate oxidation life of the phenothiazines to be superior to the unsubstituted N-phenyl-α-naphthylamine. Sunlight life of the dibornylphenothiazine is far superior to the conventional N-phenyl-α-naphthylamine or phenothiazine itself.

The following test illustrates more convincingly the new superior antioxidants. The stability of turbine oil was determined according to ASTM Standard Method D 943–54. Using this method, the test was stopped when the acid number exceeded about 2.0. The acid number was found according to ASTM Standard Method D 974. The used oil was filtered through Whatman No. 2 filter paper, the precipitate washed with hexanes and dried.

The table illustrates a comparison of N-phenyl-α-naphthylamine and dibornylphenothiazine. The tests were of paraffin base oil, plus 3.1% basic calcium sulfonate plus 0.5% sulfurized diparaffin sulfide, plus 0.03% alkyl phenol ethylene oxide reaction product, plus .001% dimethyl silicone foam inhibitor.

TABLE II

| Inhibitor | N-Phenyl-α-Naphthyl-amine | Dibornyl-pheno-thiazine |
| --- | --- | --- |
| Amount of inhibitor, percent | .3 | .55 |
| Hours after test was terminated | 1,172 | 1,172 |
| Acid number at termination of test | 2.32 | 2.64 |
| Insoluble materials, mg | 866 | 849 |
| Percent nitrogen in insoluble material | .14 | .06 |

As illustrated above, the amount of insolubles attributable to the antioxidant is considerably less using the improved oil composition. The oil composition containing the old N-phenyl-α-naphthylamine inhibitor was roughly about three times poorer.

Ordinarily, a major proportion of lubricating oil is employed in combination with a minor amount of inhibitor sufficient to inhibit oxidation. Preferably, the amount of inhibitor in oil will vary from about 0.05% to about 5.0%. The effective amount, however, can easily be determined by those skilled in the art.

The inhibitors of this invention are used with good effect in any of a wide variety of oils of lubricating viscosity or of blends of such oils. Thus, the base oil can be a mineral lubricating oil of either paraffinic or naphthenic types. Synthetic lubricating oils may also be used, including alkylene oxide polymers such as the 2-ethylhexanol-initiated polymer of propylene oxide and/or ethylene oxide. Esters of carboxylic acids, such as di(2-ethylhexyl) sebacate are also suitable. Silicate esters, such as tetraoctyl silicate, hexa(2-ethylbutoxy) disiloxane and mixtures thereof may be used. If desired, the base oil can be a mixture of mineral oils and/or synthetic oils.

The inhibitors of this invention are also useful in lubricant compositions in combination with other additives such as pour point depressants, oiliness and extreme pressure agents, detergents, viscosity index improvers, soap thickening agents of the type employed in greases, as well as other conventional additives. Illustrative additives of these types include the polyalkyl methacrylate and dialkyl fumarate pour point depressant, tricresyl phosphate oiliness agents, octadecenyl amine salt of mixed mono- and didodecyl phosphate extreme pressure agent, polydodecyl methacrylate viscosity index improvers, calcium petroleum sulfonate detergents, polyglycol substituted polymeric dispersants and others.

According to the present invention, the antioxidants may be admixed with oil to form concentrates. The concentrate can be later diluted to form the finished product.

I claim:

1. A lubricating oil containing as a non-sludging antioxidant from 0.05 to 5% by weight dibornylphenothiazine.

2. A lubricating oil containing as a non-sludging antioxidant from 0.05 to 5% by weight 3,7-dibornylphenothiazine.

3. A lubricating oil containing as a nonsludging antioxidant, from 0.05 to 5.0% by weight of a mixture of monobornylphenothiazine and dibornylphenothiazine wherein the dibornylphenothiazine is present in the amount of at least 50% by weight.

References Cited by the Examiner

UNITED STATES PATENTS

| | | | |
| --- | --- | --- | --- |
| 2,123,929 | 7/1938 | Bousquet | 260—243 |
| 2,227,908 | 1/1941 | Lewis | 252—47 |
| 2,308,691 | 1/1943 | Hughes | 252—47 |
| 2,516,120 | 7/1950 | Houston | 252—47 |
| 2,587,660 | 3/1952 | Smith | 260—243 |
| 2,587,662 | 3/1952 | Smith | 260—243 |
| 2,781,318 | 2/1957 | Cyphers | 252—47 |
| 2,971,912 | 2/1961 | Elliott et al. | 252—47.5 |
| 3,102,871 | 9/1963 | Spacht | 260—243 |

DANIEL E. WYMAN, *Primary Examiner.*

L. G. XIARHOS, *Assistant Examiner.*